H. J. DRAGER.
BINDER TRUCK.
APPLICATION FILED AUG. 21, 1909.
1,034,986.
Patented Aug. 6, 1912.
2 SHEETS—SHEET 1.
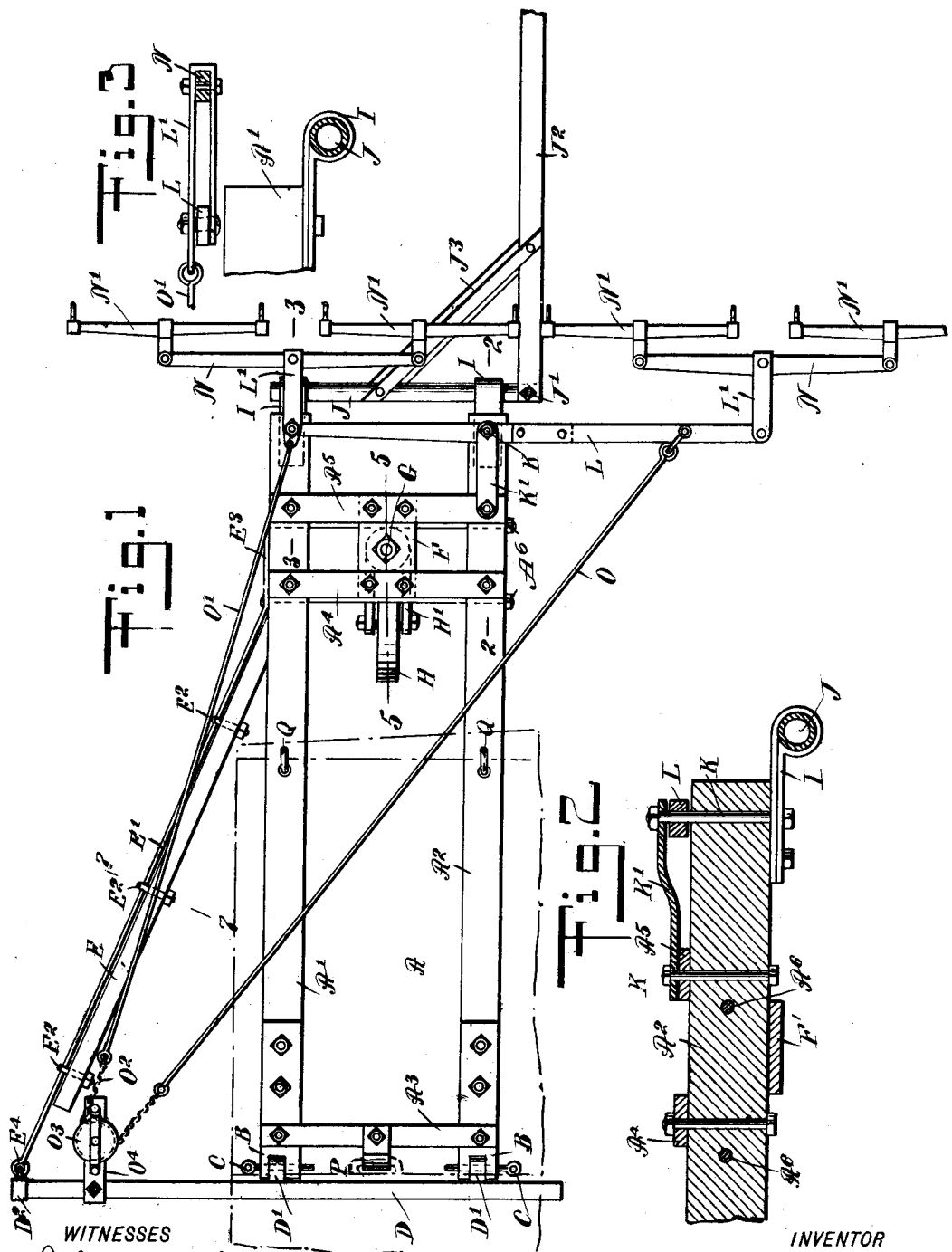
WITNESSES
INVENTOR
Herman J. Drager
BY
ATTORNEYS

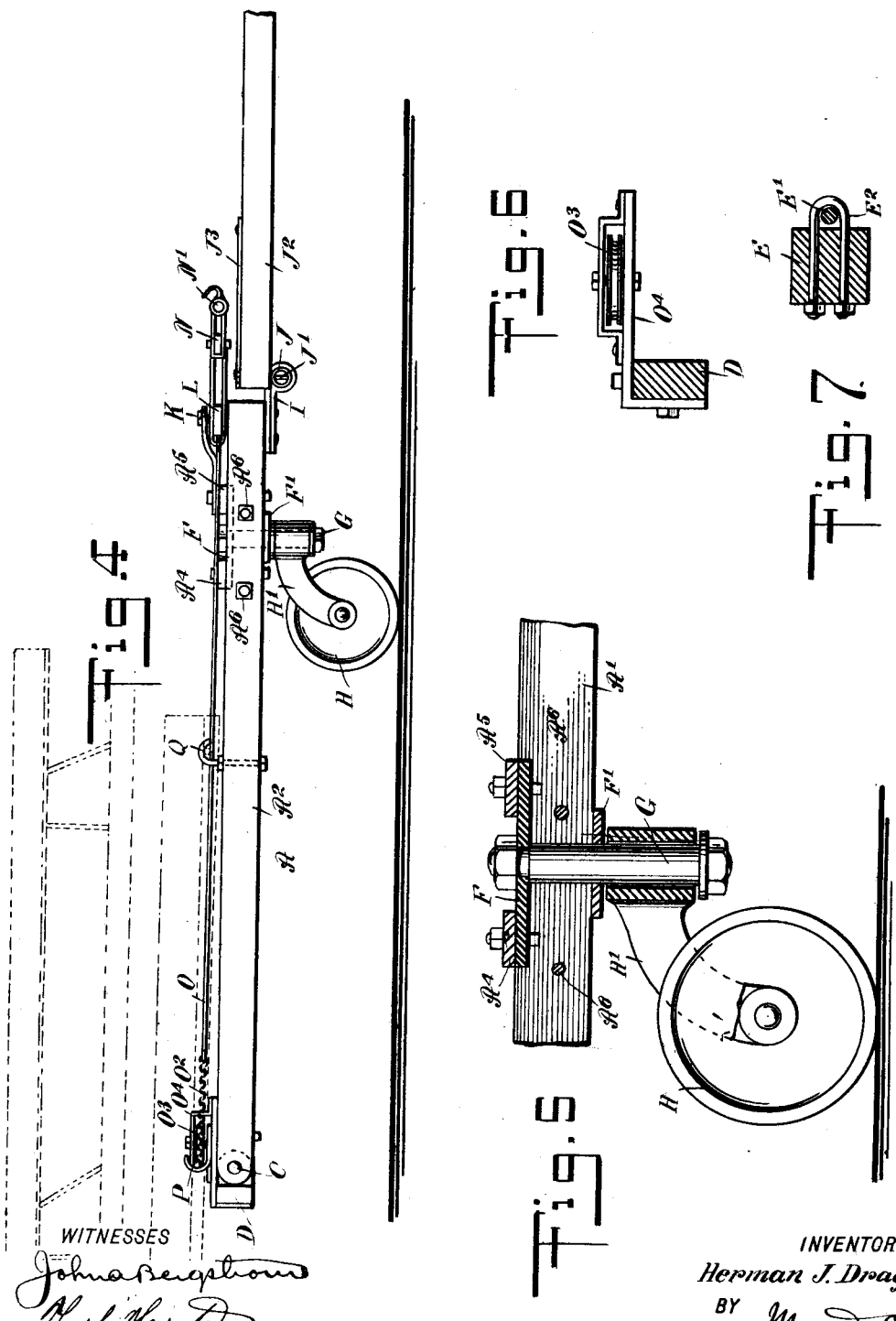

UNITED STATES PATENT OFFICE.

HERMAN J. DRAGER, OF ORLANDO, OKLAHOMA.

BINDER-TRUCK.

1,034,986.  Specification of Letters Patent.  Patented Aug. 6, 1912.

Application filed August 21, 1909. Serial No. 514,030.

To all whom it may concern:

Be it known that I, HERMAN J. DRAGER, a citizen of the United States, and a resident of Orlando, in the county of Logan and State of Oklahoma, have invented a new and Improved Binder-Truck, of which the following is a full, clear, and exact description.

The invention relates to grain binders and its object is to provide a new and improved binder truck for attachment to a grain binder, for drawing the latter over the field or for transporting the binder from place to place. For the purpose mentioned the truck frame is arranged at its rear end for pivotal connection with the binder, and on the front end is pivoted a tongue and an evener, and in the rear of the front end is arranged a swiveled supporting wheel to support the truck frame.

A practical embodiment of the invention is represented in the accompanying drawings forming a part of this specification, in which similar characters of reference indicate corresponding parts in all the views.

Figure 1 is a plan view of the improved binder truck; Fig. 2 is an enlarged sectional side elevation of part of the same on the line 2—2 of Fig. 1; Fig. 3 is a similar view of another part of the improvement on the line 3—3 of Fig. 1; Fig. 4 is a side elevation of the binder truck; Fig. 5 is an enlarged sectional side elevation of the supporting wheel and its mounting on the truck frame, the section being on the line 5—5 of Fig. 1; Fig. 6 is an enlarged side elevation of the sheave for the equalizing device, the beam carrying the sheave being shown in section; and Fig. 7 is an enlarged cross section of the truck frame brace, the section being on the line 7—7 of Fig. 1.

The truck frame A of the binder truck is formed by the side beams A', A² and cross beams A³, A⁴, A⁵, and bolts A⁶ connecting the side beams with each other, the cross beam A³ being located at the rear ends of the beams A', A² and the spaced cross beams A⁴, A⁵ and the bolts A⁶ being located near the front ends of the said side beams. On the rear ends of the side beams A', A² are secured the eyes B, engaged by pivot pins C, also engaging eyes D' on the beam D forming part of the binder on which the truck is to be used. From the side beam A' extends outwardly and rearwardly a brace E, provided with a bar E', secured in place to the brace E by clips E² (see Figs. 1 and 7), the forward end E³ of the said bar E' being fastened to the beam A' by the bolt A⁶, and the rear end of the said bar E' terminating in an eye E⁴, engaging a hook D² on the beam D.

On the front cross beams A⁴, A⁵ is secured a bearing F, and a similar bearing F' is attached to the under side of the side beams A', A², as plainly indicated in Figs. 4 and 5, and in the said bearings F and F' is mounted to turn a vertically disposed pivot G, on the lower end of which is mounted to swing the frame H' of a supporting wheel H, adapted to travel on the ground to support the binder truck.

On the front ends of the side beams A' and A² are secured bearings I, having a transversely-extending pivot J the said pivot J being preferably in the form of a piece of tubing, fastened at one end by a bolt J' or other means to the rear end of a tongue J², so that the latter can swing up and down. A brace J³ connects the pivot J with the tongue J², as indicated in Fig. 1. Near the forward end of the beam A² is arranged a vertically disposed pivot pin K, for the evener L to swing on, the said pin K being engaged at the top by a strap K', fastened at its rear end to the front cross beam A⁵ by the same bolt which fastens the cross beam A⁵ to the side beam A². On the outer ends of the evener L are fulcrumed forwardly-extending straps L', supporting the doubletrees N, carrying the usual swingletrees N', as plainly indicated in Fig. 1, to allow of attaching two draft animals to the truck at each side of the pole J². The evener L is connected at opposite sides of its pivot pin K with the ends of rods O, O', extending rearwardly and to one side, and connected at their rear ends with each other by a chain O², passing around a sheave O³, having its frame O⁴ bolted or otherwise secured to the beam D of the binder. Thus by the arrangement described the pull of the draft animals is equalized.

On the rear cross beam A³ is secured a hook P, adapted for engagement with the under side of the platform of the binder and on the side beams A', A², intermediate the cross beam A³ and the cross beam A⁴ are arranged hooks Q for engagement with the outer end of the platform of the binder when the said platform is placed upon the truck, as shown in dotted lines in Fig. 1.

From the foregoing, it will be seen that the truck can be readily attached to the beam D of the grain binder, to allow of conveniently drawing the binder over the field while harvesting the grain, and the binder platform may be readily supported upon the truck when transporting the binder over roads from one place to another.

Having thus described my invention, I claim as new and desire to secure by Letters Patent:

1. A binder truck, comprising a frame having side beams, cross bars connecting the beams, and a rearwardly extending diagonal brace, means for connecting the said beams and brace with a binder, a supporting wheel having a vertical pivot mounted in the forward end of the truck, an evener mounted on the forward end of one beam, a sheave, means for attaching said sheave to a binder at one side of the rear ends of the beams, and a flexible connection passing around the sheave and having its ends connected with the evener.

2. In a binder truck, the combination of a frame having at its forward part a wheel mounted on a vertical pivot and provided with means whereby it may be connected with a binder, an evener mounted on the forward part of the frame at one side thereof, a sheave, means for mounting the sheave on a binder at the rear ends of the beams and at the side of the beam opposite that to which the evener is pivoted, and a flexible connection passing around the sheave and having its ends connected with the evener on opposite sides of its pivot.

3. A binder truck, comprising a truck frame having side beams and front and rear cross beams, a supporting wheel swiveled on the said truck frame near the front cross beam thereof, a hook on the rear end of the said truck frame for engagement with the platform of the binder, and holding hooks on the upper faces of the side beams of the frame, the said holding hooks being arranged for engagement with the platform to hold it on the truck frame.

4. A binder truck, comprising a truck frame having side beams and front and rear cross beams connecting the side beams with each other, means for pivotally connecting the rear ends of the said side beams with the binder, an evener mounted on the front end of one of the said side beams, a sheave, means for mounting the sheave on a binder at one side of the rear ends of the beams, a chain or cord passing around the sheave and having its ends secured to the evener, a supporting wheel having a vertical pivot, a bearing mounted on the said front cross beams of the truck frame and in which the pivot of the wheel is mounted, a hook on the rear cross beam of the truck frame for engagement with the platform of the binder, and a hook on each of the side beams of the said truck frame for engagement with the outer end of the platform.

In testimony whereof I have signed my name to this specification in the presence of two subscribing witnesses.

HERMAN J. DRAGER.

Witnesses:
 CHAS. A. WILLETT,
 JOHN A. HANSEN.

Copies of this patent may be obtained for five cents each, by addressing the "Commissioner of Patents. Washington, D. C."